United States Patent
Wang (10) Patent No.: US 12,182,060 B2
(45) Date of Patent: Dec. 31, 2024

(54) SYSTEM ARCHITECTURE TO SELECTABLY SYNCHRONIZE TIME-BASES

(71) Applicant: TEXAS INSTRUMENTS INCORPORATED, Dallas, TX (US)

(72) Inventor: Jian Wang, Sugar Land, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 16 days.

(21) Appl. No.: 18/190,222

(22) Filed: Mar. 27, 2023

(65) Prior Publication Data

US 2023/0229621 A1    Jul. 20, 2023

Related U.S. Application Data

(63) Continuation of application No. 17/131,180, filed on Dec. 22, 2020, now Pat. No. 11,615,050.

(51) Int. Cl.
*G06F 13/42* (2006.01)
*G06F 15/78* (2006.01)

(52) U.S. Cl.
CPC ...... *G06F 13/4295* (2013.01); *G06F 13/4291* (2013.01); *G06F 15/7807* (2013.01); *G06F 2213/0026* (2013.01)

(58) Field of Classification Search
CPC ............. G06F 13/4295; G06F 13/4291; G06F 15/7807
See application file for complete search history.

(56) References Cited

U.S. PATENT DOCUMENTS

| | | | | |
|---|---|---|---|---|
| 6,263,450 | B1 * | 7/2001 | Predko | G06F 1/025 377/52 |
| 10,944,407 | B1 * | 3/2021 | Soni | H03L 7/07 |
| 2012/0155603 | A1 * | 6/2012 | Mackenna | H03K 21/38 377/27 |
| 2020/0331480 | A1 | 10/2020 | Zhang et al. | |

FOREIGN PATENT DOCUMENTS

EP    3863199 A1 *  8/2021   ............... G06F 1/14

* cited by examiner

*Primary Examiner* — David E Martinez
(74) *Attorney, Agent, or Firm* — Michael T. Gabrik; Frank D. Cimino (57) ABSTRACT

A system timer bus used by the processor elements in an ARM-based system on a chip (SoC) is driven using a Precision Time Measurement (PTM) value. This allows the processor elements to be synchronized to the PCIe ports that use PTM. When two SoCs are connected using PCIe links, this example allows the processor elements in both SoCs to be synchronized. As the processor elements are synchronized, associated tasks on the two SoCs are synchronized, so that overall operations are synchronized.

16 Claims, 7 Drawing Sheets

SYSTEM ARCHITECTURE TO SELECTABLY SYNCHRONIZE TIME-BASES

CROSS-REFERENCE TO RELATED APPLICATIONS

This application is a continuation of U.S. patent application Ser. No. 17/131,180, filed Dec. 22, 2020, which is incorporated by reference herein in its entirety.

BACKGROUND

As the processing demands of modern vehicular and industrial system increase, it becomes useful to synchronize time bases across multiple networks, devices, interfaces, and modules within the same device, such as systems on a chip (SoCs). As an SoC is operating associated tasks, synchronization of the tasks may benefit from a correct order of processing, timeliness of signaling and alert messages, as well as real-time controls across different levels of networks. Existing time synchronization protocols, such as IEEE 1558 and IEEE 802.AS as defined for Ethernet networks, Precision Time Measurement (PTM) as defined for Peripheral Component Interconnect Express (PCIe), ensure correct time synchronization across different interconnect systems. No standard is available today specifying how to synchronize time bases received from these interfaces within an SoC. For example, no standard exists governing how to synchronize local processor cores, such as ARM Cortex Ax cores, in the SoC to the time basis received from the PTM protocol.

SUMMARY

In one example, the system timer bus used by the processor elements in an ARM-based SoC is driven using a PTM value. This allows the processor elements to be synchronized to the PCIe ports that use PTM. When two SoCs are connected using PCIe links, this example allows the processor elements in both SoCs to be synchronized. As the processor elements are now synchronized, associated tasks on the two SoCs are synchronized, so that overall operations are synchronized, allowing improved system capabilities, especially for real time or coordinated operations.

BRIEF DESCRIPTION OF THE DRAWINGS

For a detailed description of various examples, reference will now be made to the accompanying drawings in which.

DETAILED DESCRIPTION

In systems such as control and factory automation systems, it is important to maintain a synchronized time-base across multiple processors. Standard protocols such as PCIe PTM or IEEE 1588 allow devices to receive time synchronization information from a system master. However, within a single chip such as a SoC, there is no defined timing protocol across the SoC's subsystem. As such, synchronizing the central processing units (CPUs) within an SoC (e.g., ARM processors) to a received time-base remains a challenge. Some techniques for synchronizing time bases use a software calibration method, where the rate differences between the PTM time-base and an ARM generic timer is calculated and applied to the timeout values when timers are programmed. This indirect method is only accurate to the extent that the system time master has a constant offset from local time, and extra time is available for software to apply the timer offset. However, the system time master does not always have a constant offset with respect to a local time base, and there may not be sufficient time available for software to program the timer offset.

The embodiments described herein drive ARM generic timers with a received time-base from the PTM hardware. Doing so allows ARM timers to be directly driven by the PTM, thereby eliminating the need for software to apply offsets when programming timers. Additionally, the described technique can adapt to variations of system time master.

Figure 1:
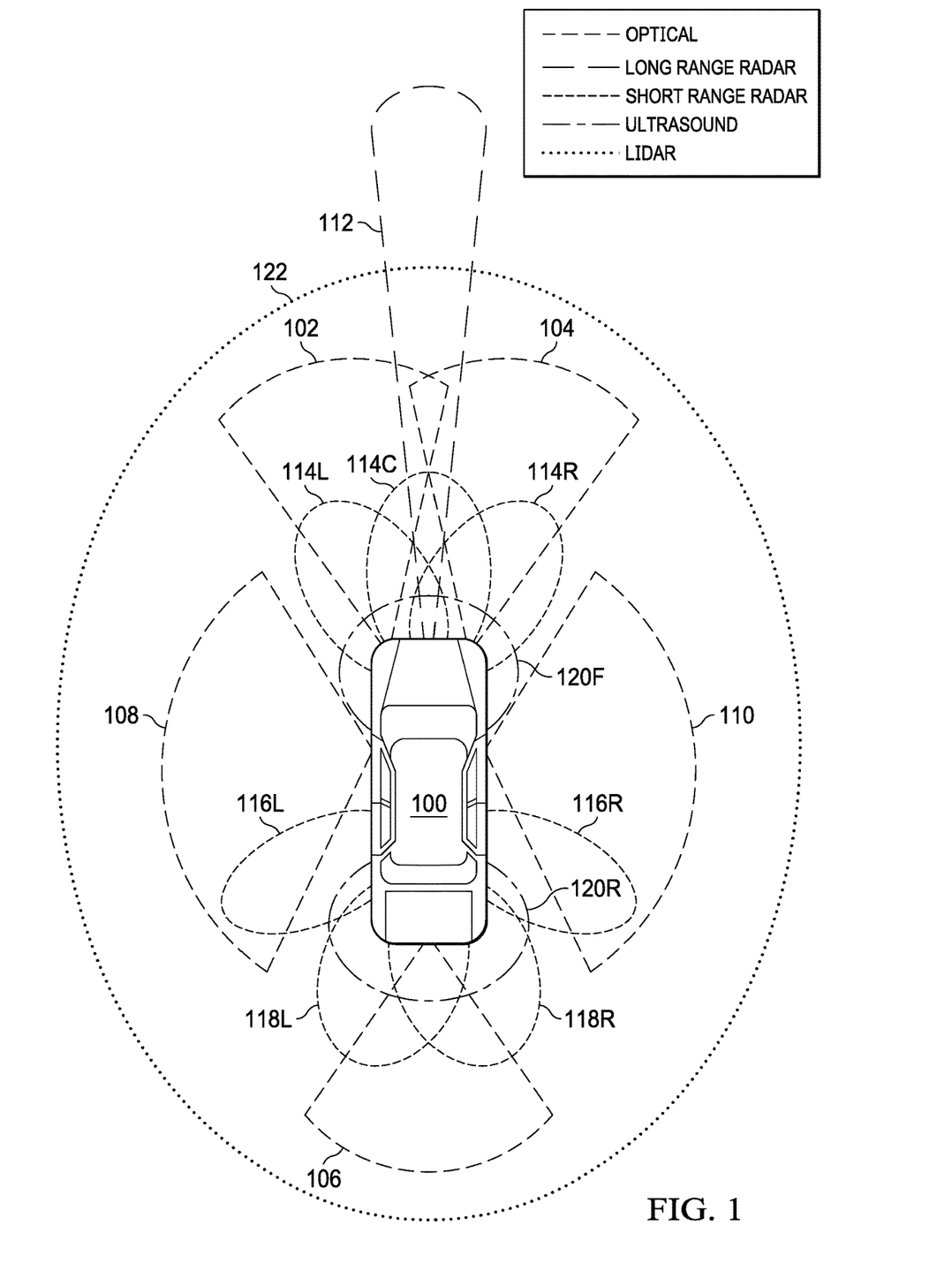
FIG. 1 is an illustration of a vehicle and various sensors associated with the vehicle.

The techniques described herein can apply to a variety of applications such as control systems within an automation application and other systems. FIG. 1, for example, shows a vehicle 100 in which the described techniques can be used to ensure timing within a network and within chips (e.g., SoCs) provided in the vehicle. It is desirable that the signals from the various sources (endpoints) within the vehicle's network are synchronized to provide the most coherent data used by the various autonomous processors within the vehicle The vehicle 100 includes a set of cameras, other optical sensors, radar sensors, ultrasound sensors, and/or other suitable sensors. In various examples, the optical sensors include left camera 102 and right camera 104, which provide a stereo image from the front of the vehicle 100 for lane departure warnings, traffic sign recognition and collision alert. A rear camera 106 provides a rear view for parking assistance. A left side camera 108 provides a left-side view and a right camera 110 provides a right-side view. The captured images of the cameras 102, 104, 106, 108, 110 are combined to provide a bird's eye view.

Examples of radar sensors include a long-range radar 112 provided at the front of the vehicle 100 for adaptive cruise control. Three shorter range radar units 114L, 114C and 114R are provided at the front of the vehicle 100 enable cross traffic alert and front collision alert. Radar units 116L and 116R are provided at the left and right side of the vehicle 100 for blind spot detection. Radar units 118L and 118R are provided at the rear of the vehicle 100 for rear collision alert. Illustrative ultrasound units 120F and 120R are provided at the front and rear of the vehicle 100 for parking assistance. A LIDAR (Light Detection and Ranging) sensor 122 has a 360° pattern. These camera, radar, LIDAR and ultrasound sensors provide the inputs to various advanced driver assistance systems (ADAS), especially for autonomous vehicle use. These sensors are just examples and many other sensors can be used as well.

Figure 2:
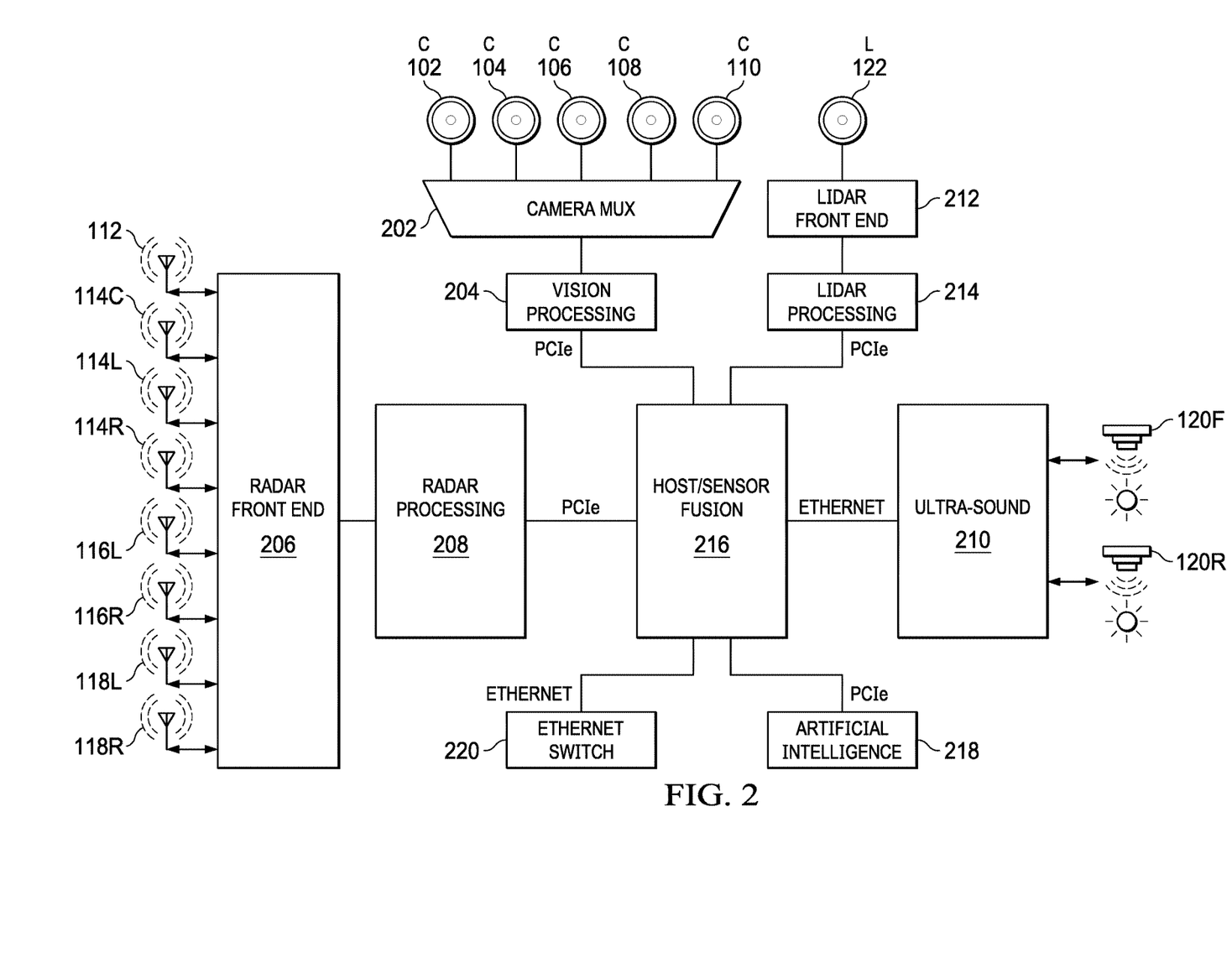
FIG. 2 is a block diagram of one example of a vehicle system including the sensors of FIG. 1, processors associated with the sensors and higher-level processors.

Referring now to FIG. 2, the systems and sensors of the vehicle 100 are shown. In the example, cameras 102, 104, 106, 108 and 110 are connected to a camera multiplexer 202. The camera multiplexer 202 provides a multiplexed output to a vision processing module 204. Long-range radar 112 and radar units 114L, 114C, 114R, 116L, 116R, 118L and 118R are connected to a radar front end module 206. The radar front end module 206 provides its output to a radar processing module 208. LIDAR sensor 122 is connected to a LIDAR front end module 212, which provides its output to a LIDAR processing module 214. Ultrasound detectors 120R and 120L are connected to an ultrasound module 210. The vision processing module 204, the LIDAR processing module 214, and the radar processing module 208 are connected to a host/sensor fusion module 216 which integrates the various sensor outputs developed by the other modules. An artificial intelligence module 218 is connected to the host/sensor fusion module 216 to provide the specialized processing useful in autonomous vehicle operation. The vision processing module 204, the LIDAR processing module 214, the radar processing module 208 and the artificial intelligence module 218 are connected to the host/sensor fusion module 216 using Peripheral Component Interconnect Express® (PCIe®) links. The PCIe links provide a high-performance link between the modules to allow exchange of high-speed outputs. An Ethernet link is used between the ultrasound module 210 and the host/sensor fusion module 216 as the ultrasound signals are generally lower rate than the cameras, radars and LIDAR. An Ethernet switch 220 is connected to the host/sensor fusion module 216 to provide access to other sensor modules and other control modules. It is understood that more or fewer sensors can be connected to a given module and multiple sensor types can be provided to a single module. It is also understood additional modules may be present in a given vehicle and that the illustrated modules are provided for purposes of this description.

Figure 3:
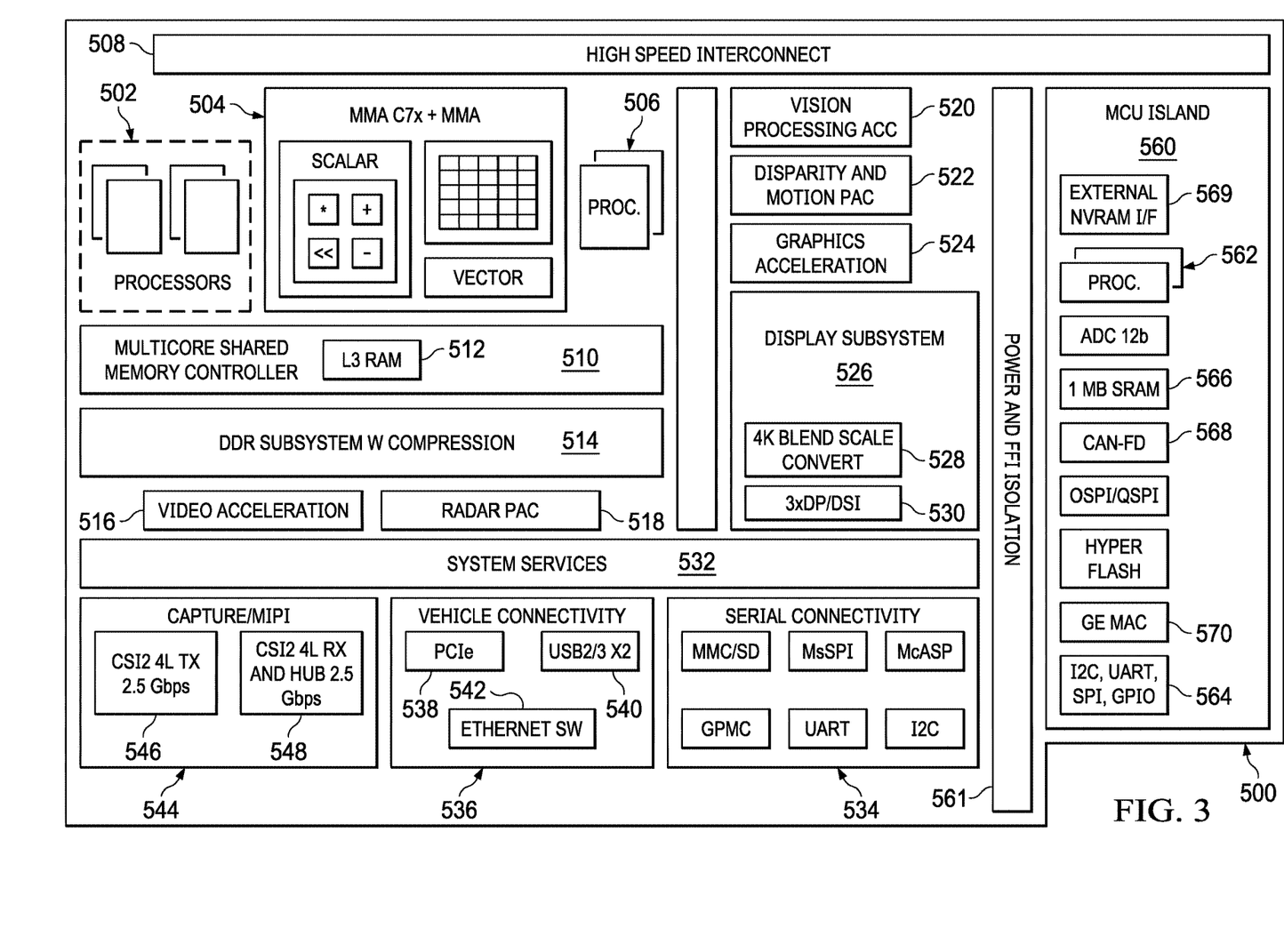
FIG. 3 is a hardware block diagram of one example of a SoC to form the processors of FIG. 2.

FIG. 3 is a block diagram of an illustrative system on a chip (SoC) 500 that can be used to implement any or all of the vision processing module 204, radar processing module 208, LIDAR processing module 214, ultrasound module 210 and host/sensor fusion module 216. In certain embodiments, the artificial intelligence module 218 may have a similar SoC 500. In other embodiments, the artificial intelligence module 210 may have a similar SoC 500 but the SoC 500 may include more processors and more specialized processing capabilities and less input/output capabilities.

A series of microprocessors 502, such as ARM® A72 or A53 cores, form the primary general-purpose processing block of the SoC 500, while a digital signal processor (DSP) 504 provides specialized computing capabilities. Simpler microprocessors 506, such as ARM R5F cores, provide general control capability in the SoC 500. A high-speed interconnect 508 connects the microprocessors 502, DSP 504 and microprocessors 506 to various other components in the SoC 500. For example, a shared memory controller 510, which includes onboard memory or RAM 512, is connected to the high-speed interconnect 508 to act as the onboard RAM for the SoC 500. A double data rate (DDR) memory controller system 514 is connected to the high-speed interconnect 508 and acts as an external memory interface to external DRAM memory. A video acceleration module 516 and a radar processing accelerator (PAC) module 518 are similarly connected to the high-speed interconnect 508. A vision processing accelerator module 520 is connected to the high-speed interconnect 508, as is a depth and motion PAC module 522. A graphics acceleration module 524 is connected to the high-speed interconnect 508. A display subsystem 526 is connected to the high-speed interconnect 508 and includes conversion logic 528 and output logic 530 to allow operation with and connection to various video monitors if appropriate. A system services block 532, which includes items such as direct memory access (DMA) controllers, memory management units, general-purpose I/O's, mailboxes and the like, is provided for normal SoC 500 operation. A serial connectivity module 534 is connected to the high-speed interconnect 508 and includes modules as normal in an SoC. A vehicle connectivity module 536 provides interconnects for external communication interfaces, such as PCIe block 538, universal serial bus (USB) block 540 and an Ethernet switch 542. A capture/MIPI module 544 includes a four-lane CSI-2 compliant transmit block 546 and a four-lane CSI-2 receive module and hub 548.

An MCU island 560 is provided as a secondary subsystem and handles operation of the integrated SoC 500 when the other components are powered down to save energy. A processor 562, such as one or more ARM R5F cores, operates as a master and is coupled to the high-speed interconnect 508 through an isolation interface 561. An MCU general purpose I/O (GPIO) block 564 operates as a slave. MCU RAM 566 is provided to act as local memory for the MCU ARM processor 562. A controller area network (CAN) bus block 568, an additional external communication interface, is connected to allow operation with a conventional CAN bus environment in a vehicle. An Ethernet MAC (media access control) block 570 is provided for further connectivity in the vehicle. Nonvolatile memory (NVM) is connected to the MCU ARM processor 562 through an external NVRAM interface 569. The NVM contains programs executed by processors 502, DSP 504, processors 506 and MCU ARM processor 562.

FIG. 3 provides an example of an SoC configuration; however, many other SoC configurations can be utilized.

As the camera, LIDAR, radar and ultrasound outputs are all real time signals and all are involved in developing vehicle state for autonomous operation, as noted above it is desirable that the signals from the various sources are synchronized to provide the most coherent data used by the various autonomous processors. The less synchronized the data is, the poorer the possible control and decisions may be because of the unclear vehicle environmental conditions. For example, if an object, such as a person walking across the street, is captured in the cameras, front end radar and LIDAR, but those sensors are poorly synchronized, the actual location of the person may not be accurately resolved, thereby potentially creating problems for the pedestrian detection and avoidance system.

Figure 4:
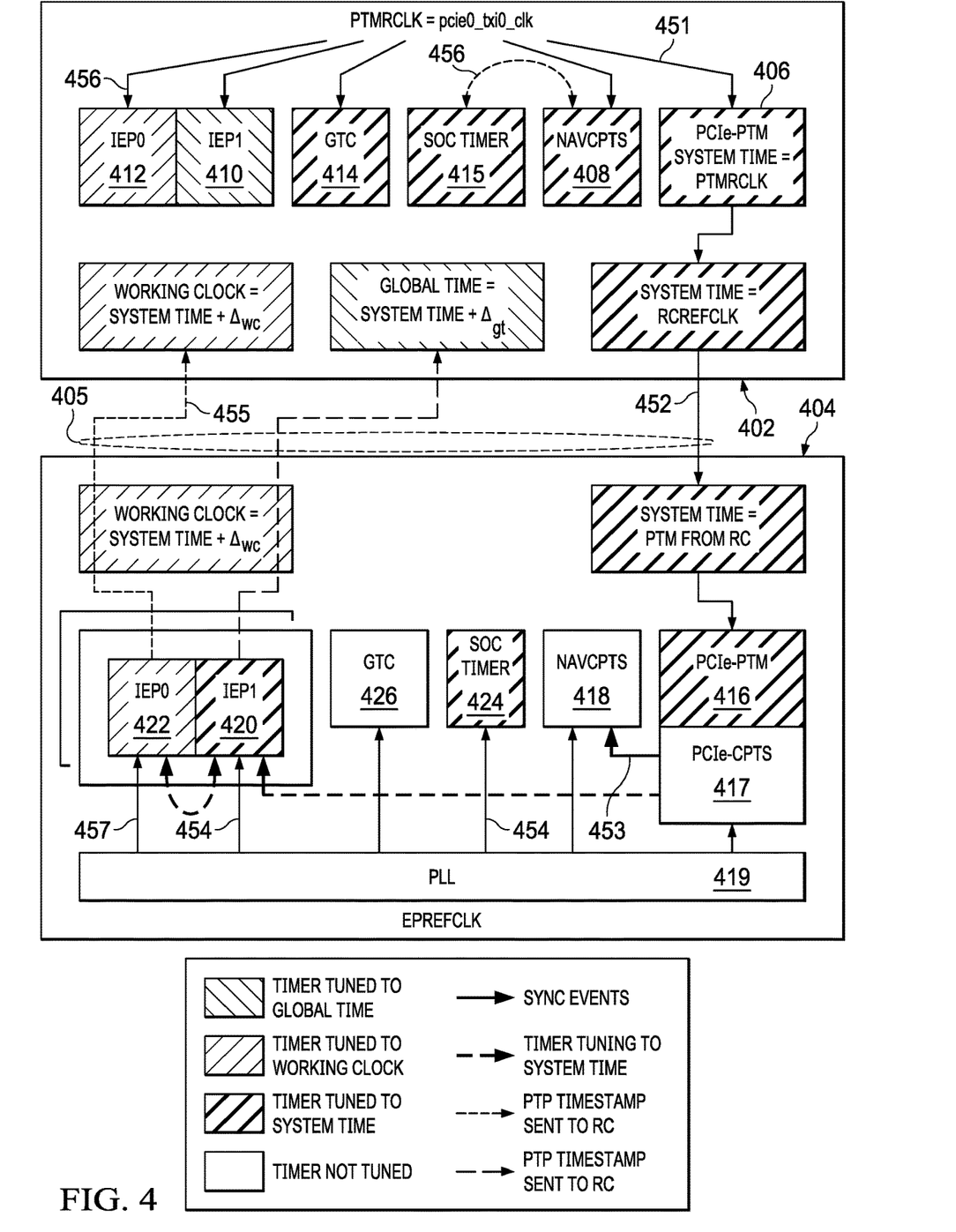
FIG. 4 is an illustration of one example of time synchronization in a system formed by two SoCs linked over PCIe.

FIG. 4 illustrates the complexities of synchronizing various sources within SoCs and between SoCs. In FIG. 4, a PCIe root controller device 402, such as the host/sensor fusion module 216, is illustrated as being connected to a PCIe endpoint device 404, such as the vision processing module 204, the LIDAR processing module 214 or the radar processing module 208, using a PCIe link 405. As illustrated, there are three separate main times involved but there is also a fourth time. The first main time is System Time, the second is Working Clock and the third is Global Time. The fourth time (illustrated with respect to FIG. 5 and described below) is the time used by the processor elements in an ARM®-based system. System Time is the time base between two devices when timestamp values are exchanged between the devices. Typically, all timestamps are based on System Time. System Time is synchronized via the PCIe Precision Time Measurement (PTM) protocol across the PCIe link 405 where the PCIe root controller 402 designates its clock as System Time. In the example of FIG. 4, the PCIe endpoint device 404 acts as a PTM requester and then configures an industrial ethernet peripheral (IEP) timer (e.g., IEP1) to allow outgoing Ethernet packets to be timestamped based on the Precision Time Protocol (PTP).

Working Clock is sometimes referred to as communication time. Working Clock is a time base for network packet scheduling and traffic management. In the example of FIG. 4, the PCIe endpoint device 404 receives PTP packets (which carry, for example, PTP timestamps from an IEP network interface and then industrial Ethernet firmware parses the PTP packets and sends out recorded timestamps to the PCIe root controller 402 for operation in accordance with, for example, the 802.1AS protocol.

Global Time is the time with which all time sensitive tasks comply in the domain. Typically, these time sensitive applications are scheduled based on the Global Time. In the example of FIG. 4, similar to Working Clock, the Global Time is received on an IEP Ethernet port via the 802.1AS protocol. The industrial Ethernet firmware parses the PTP packets and sends timestamps to the PCIe root controller device 402, where the actual 802.1AS protocol stack resides.

Figure 5:
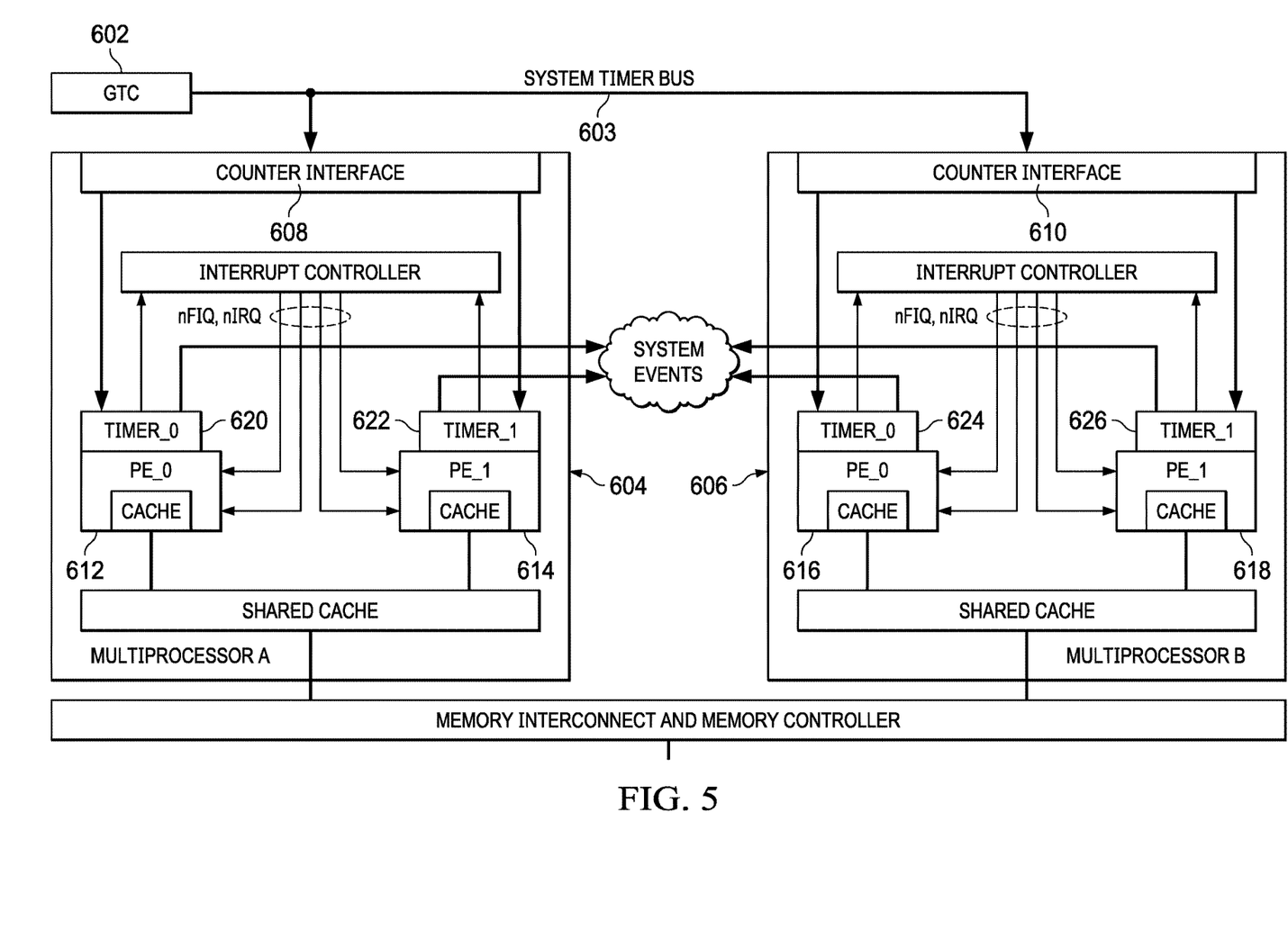
FIG. 5 is a block diagram of generic timer distribution in a multi-processor ARM processor system, focused on the processor elements.

FIG. 5 shows an example implementation of an ARM® processor. The implementation of FIG. 5 includes a Global Timebase Counter (GTC) 602. The GTC 602 of an ARM processor generates timer values and provides the timer values over a system timer bus 603 to each processor (e.g., multiprocessor A core 604 and multiprocessor core B). As will be described below (e.g., in regard to FIG. 6), the GTC 602 is selectively provided with a particular clock to synchronize the timer values to the multiprocessor cores A and B. The fourth time mentioned above is the time used by the processors in an ARM®-based system. The timer values from the GTC 602 across the system timer bus 603 comprise, for example 64-bit timestamp values (which may be Gray-coded), and provide the basis for System Time to ARM-based processors. The timer values output from the GTC 602 are provided over the system timer bus 603 to a first processor core (e.g., multiprocessor core A 604) and to a second processor core (e.g., multiprocessor core B 606). As the timer value output of the GTC 602 is a 64-bit value, a counter interface 608 in the processor core 604 and counter interface 610 in the processor core 606 track the GTC 602 value. Each processor core 604, 606 includes two processor elements (PE) zero and one, PE_0 and PE_1. A processor element is an implementation of an ARM processor core. A processor element has its own program counter and can execute a program. In processor core 604, the processor elements are processor PE_0 612 and PE_1 614. In processor core 606, the processor elements are PE_0 616 and PE_1 618. PE_0 612 includes a timer_0 620 used to trigger events based on values in the counter interface 608, which reflects the timer value transmitted by the GTC 602 over the system timer bus 603. Similarly, PE_1 614 includes a timer_1 622 to trigger events based on values in the counter interface 608. Similarly, PE_0 616 includes a timer_0 624 which triggers events based on the value in the counter interface 610, while PE_1 618 includes a timer_1 626 which triggers events based on the value in the counter interface 610.

Figure 6:
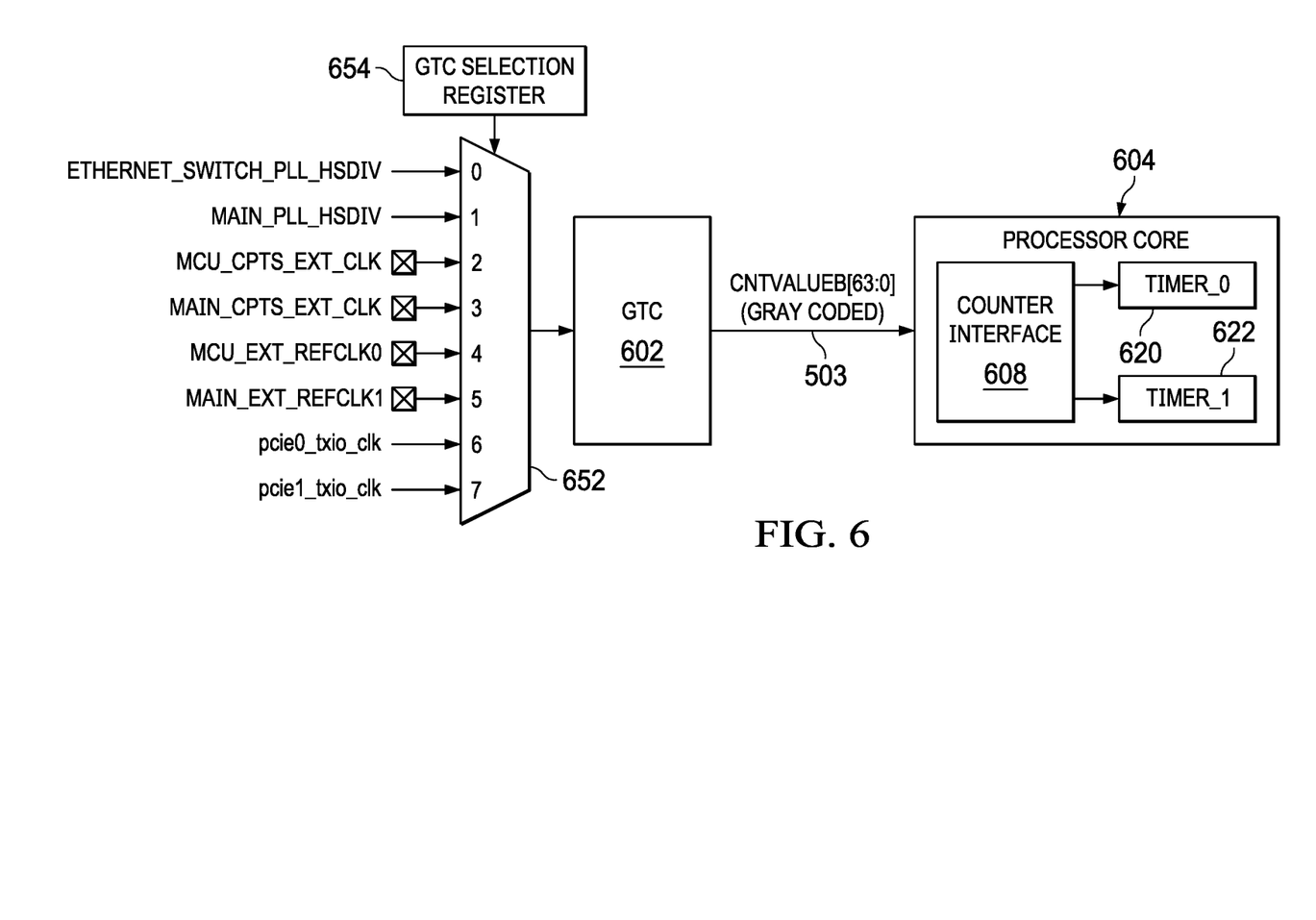
FIG. 6 is a block diagram of generic timer distribution in a multi-processor ARM processor system, focused on the generic timer.

FIG. 6 illustrates a higher-level view of the overall system timer operation in an ARM-based system. Processor core 604 is illustrated with the counter interface 608 connected to the timer_0 620 and timer_1 622. The GTC 602 provides timer values to the counter interface 608. The GTC 602 receives its timer clock input from a multiplexer 652. In the example of FIG. 6, there are eight different clock source inputs to the multiplexer 652 that can be selected using a GTC selection register 654. In the example of FIG. 6, the eight possible clock sources are a MAIN phase lock loop (PLL) high speed divider (MAIN_PLL_HSDIV) signal, an Ethernet switch PLL high speed divider (ETHERNET_SWITCH_PLL_HSDIV) signal, a MAIN external reference clock (MAIN_EXT_REFCLK1) signal, an MCU external reference clock (MCU_EXT_REFCLK0) signal, a MAIN common platform time sync (CPTS) external reference clock (MAIN_CPTS_EXT_CLK) signal, an MCU CPTS external reference clock (MCU_CPTS_EXT_CLK) signal, and two different PCIe transmit clock (PCIe0_TXI0_CLK and PCIe1_TX10_CLK) signals. ETHERNET_SWITCH_PLL_HSDIV signal is provided from the ethernet switch 542 in FIG. 3 (although the clock signal itself is not shown). The MAIN_PLL_HSDIV signal is provided from a PLL such as PLL 419 (via a frequency divider). The MCU_CPTS_EXT_CLK signal, the MAIN_CPTS_EXT_CLK signal, the MAIN_EXT_REFCLK signal, and the MCU_EXT_REFCLK0 signal are provided from to the SoC via external clock source input pins. The PCIe0_TXI0_CLK and PCIe1_TXI0_CLK signals are transmit clocks are provided from the PCIe block 538. The aforementioned clocks signals are used by their respective subsystems for their timing. In general, the clock signals input to the multiplexer are any suitable clock sources on the SoC are provided to the SoC via external pins.

FIG. 4 shows an example of multiple operations involved for software to synchronize the time basis between a host (PCIe root controller device 402) and an endpoint (PCIe endpoint device 404) interconnected by a PCIe link 405. In a first operation (identified at 451), the PCIe root controller device 402 designates, for example, PCIe0_TXI0_CLK as the basis for PTM time (although other clock signals could be used as well), from which System Time is developed. Various timers in the PCIe root controller device 402 are configured to use PCIe0_TXI0_CLK as the timer clock. For example, a PCIe PTM responder 406 uses PCIe0_TXI0_CLK as the PTM clock, which is labeled as PTMRCLK in FIG. 4 and represents the system time depicted in FIG. 4. A data movement CPTS (NAVCPTS) block 408, industrial ethernet ports IEP1 410 and IEP0 412, an SoC timer 415, a general-purpose timer, and GTC 414 all use PCIe0_TXI0_CLK as their timer clock.

In a second operation (452), the hardware in PCIe PTM responder 406 sends the PTM time from the PCIe root controller device 402 to a PCIe PTM requester 416 in the PCIe endpoint device 404 via the PTM protocol. Thus, the PTM timer value in the PCIe PTM requestor 416 is synchronized with an external device, the PCIe root controller device 402.

In a third operation (453), when the PCIe PTM requester 416 receives the PTM time, a PCIe CPTS 417 (which is a time stamping hardware engine) sends pulse train signals to a NAVCPTS block 418 (a CPTS in an ARM's navigator subsystem). A PLL 419 provides a reference clock for the PCIe endpoint device 404, which drives a NAVCPTS block 418. The timestamp from the NAVCPTS block 418 is compared to PTM time to develop $\Delta_{ptm}$.

In a fourth operation, IEP1 420 and SOC Timer 424 are configured to the system time designated by the PCIe root complex (RC) device based on the $\Delta_{ptm}$ value. With IEP1 port 420 tuned, IEP1 port 420 develops PTP timestamps for the Working Clock and Global Time with System Time. A value $T_{WC}$ is a Working Clock PTP timestamped by System Time. A value $T_{gt}$ is a global time timestamp based on the synchronized system time.

In a fifth operation (455), the $T_{WC}$ and $T_{gt}$ values are provided from the PCIe endpoint device 404 to the PCIe root controller device 402 over the connecting PCIe link. The PCIe root controller device 402 performs operations according to the 802.1AS protocol to calculate Working Clock and Global Time and also develops $\Delta_{WC}$, the clock offset between Working Clock and System Time, and $\Delta_{gt}$, the clock offset between Global Time and System Time.

In a sixth operation (456), the PCIe root controller device 402 configures an IEP0 port 412 to working time using $\Delta_{WC}$ and configures an SoC timer 415 with Global Time using $\Delta_{gt}$. The PCIe root controller device 402 provides the $\Delta_{WC}$ and $\Delta_{gt}$ values to the PCIe endpoint device 404 over the PCIe link.

In a seventh operation (457), an IEP0 422 is tuned to Working Clock using $\Delta_{WC}$ and an SoC timer 424 is tuned to Global Time using $\Delta_{gt}$. With that, the PCIe ports, first type ports, and industrial Ethernet ports, second type ports, in both the PCIe root controller device 402 and the PCIe endpoint device 404 are synchronized. The GTC 414 in the PCIe root controller device 402 is also synchronized as it is based on the same clock as the PCIe PTM responder 406.

However, absent being able to selectively provide any of multiple clock source signals to the GTC 426 in the PCIe endpoint device 404, the GTC 426 may not be synchronized in certain embodiments. As the GTC 426 is used to synchronize the processor elements in an ARM-based system, the processor elements in the PCIe endpoint device 404 may not be synchronized to the processor elements in the PCIe root controller device 402. This means that the tasks executing on the PCIe root controller device 402 and the tasks executing on the PCIe endpoint device 404 are not synchronized. If the PCIe root controller device 402 is the host/sensor fusion module 216 and the PCIe endpoint device 404 is the vision processing module 204, the camera images from the vision processing module 204 may not be aligned with the time of the host/sensor fusion module 216. This may reduce performance of the overall system in real time operations, such as autonomous vehicle operations.

Figure 7:
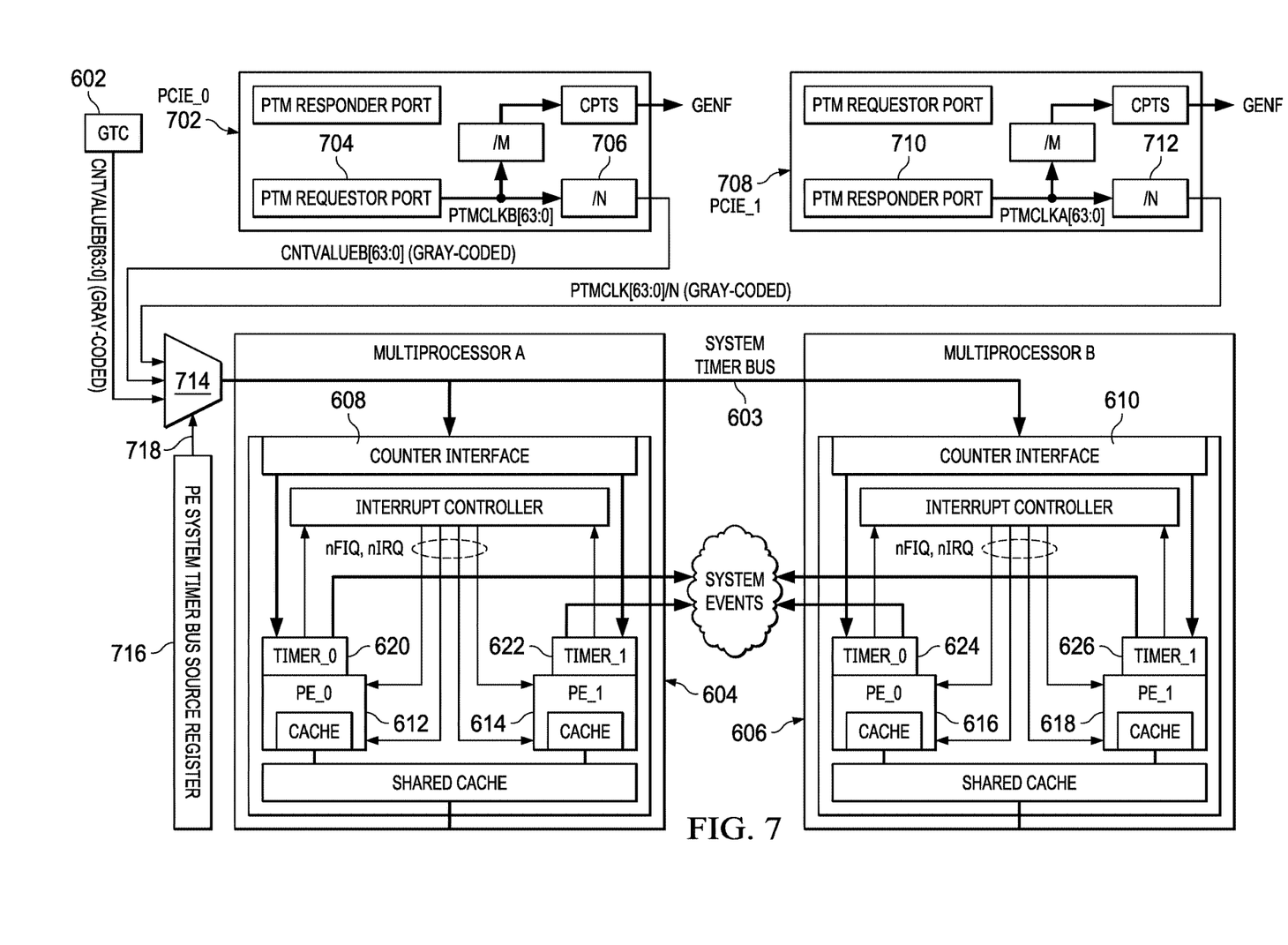
FIG. 7 is a block diagram of one example for allowing alternative source generic timer distribution in a multi-processor ARM processor system.

FIG. 7 illustrates one example of a system where the values on the system timer bus 603 utilized by the processor elements in an ARM-based system are synchronized to the PCIe root controller or master root complex (RC) time. A PCIe_0 port 702 is illustrated as a PTM requester port 704, a port which receives PTM master mime. For reference, the PCIe port of PCIe endpoint device 404 is a PTM requester port. The PTM requester port 704 operates according to the PCI-SIG® Precision Time Measurement (PTM) standard, Revision 1.0a, update Mar. 31, 2013, which is hereby incorporated by reference. As such, the PTM requester port 704 maintains a timer value or count that is synchronized to the PTM master time provided by an external device. The PTM requester port 704 provides a PTMCLKB [63:0] signal, which is a 64-bit time stamp value, and which is synchronized to PTM master time. The PTMCLKB [63:0] signal is provided to a divide by N block 706. The divide by N block 706 divides the PTMCLKB [63:0] signal by a factor of N and provides a Gray coded PTMCLK [63:0] signal as an output.

A PCIe_1 port 708 is configured to include a PTM responder port 710. A PTM responder port provides PTM master time to an external device to synchronize PTM timer values with that external device. The PTM responder port 710 provides a PTMCLKA [63:0] signal to a divide by N block 712. The divide by N block 712 divides the PTMCLK [63:0] signal by N and provides a Gray coded PTMCLK [63:0] signal as an output.

GTC 602 provides a 64-bit Gray coded signal, CNTVALUE [63:0], as an output. The CNTVALUE [63:0] signal (which also is a timestamp value), the gray coded PTMCLKB [63:0] signal from PCie_0 port 702 and the gray coded PTMCLKA [63:0] signal from PCIe_1 PTM requester port 704 are provided as three inputs to a multiplexer 714. The output of the multiplexer 714 is the system timer bus 603. The multiplexer 714 has a selection input coupled to a processor element system timer bus source register 716. The processor element system timer bus source register 716 is programmed during, for example, system initialization, and generates a selection signal 718 to multiplexer 714. System software, for example, writes a value into the processor element system timer bus source register 716 resulting in selection of one of the CNTVALUE [63:0] signal from the GTC 602, the Gray coded PTMCLKB [63:0] signal from PCie_0 port 702, or the Gray coded PTMCLKA [63:0] signal from PCIe_1 port 704 as the timer value output by multiplexer 714 on to the system timer bus 603. This allows the selection of the GTC timer value or the PTM timer value from either of the PCIe ports 702, 708 to be provided to the counter interfaces 608 and 610 of the processor elements. The timer values received by the counter interfaces are provided to the respective timers 620, 622, 624, and 626. The processor elements, such as PE_0 612, PE_1 614, PE_0 616 and PE_1 618, are thereby synchronized to PTM time based on the timer value output by multiplexer 714.

Referring then back to FIG. 4 and utilizing the configuration of FIG. 7 for the PCIe endpoint device 404, this closes the loop in an ARM-based system so that effectively the system timer bus 603 present in the PCIe endpoint device 404 is now also driven by the PTMRCLK present in the PCIe root controller device 402. The GTC 414 and PCIe PTM responder 406 of the PCIe root controller device 402 are driven by the same clock, PCIe0_TXI0_CLK (which is generated on the root complex SoC from the PCIe subsystem). As this clock forms the basis of the PTM time of the linked PCIe PTM responder 406 and PCIe PTM requester 416, PTM time in PCIe PTM requester 416 is synchronized with PTM time in PCIe PTM responder 406 and thus also GTC 414. As the PTM value from PCIe PTM requester 416 drives the system timer bus 603 in PCIe endpoint device 404, the processor elements in PCIe endpoint device 404 are synchronized to PTM time, which is synchronized with GTC 414. This allows synchronization between the processor elements in the PCIe root controller device 402 and the PCIe endpoint device 404. As the processor elements are now all synchronized, the data operations between the root controller or host and endpoint or slave are now synchronized. With all the processor and peripheral signals synchronized, the higher-level systems operating on the system, such as autonomous software for vehicle, now develop a more coherent state of the vehicle, as now all of the input data and operations on that data are synchronized.

An SoC configured as shown in FIG. 7 can act as either the PCIe root controller device 402 or the PCIe endpoint device 404 by properly configuring the PCIe ports and the multiplexer 714. To act as the PCIe root controller device 402, the GTC 602 is driven by a PCIe transmit clock via the multiplexer 652, the system timer bus 603 is driven by the GTC 602 via the multiplexer 714 and the PCIe port connected to the PCIe endpoint device 404 is configured as a PTM responder port. To act as a PCIe endpoint device 404, the PCIe port connected to the PCIe root controller device 402 is configured as a PTM requester port and the system timer bus 603 is driven by PTMCLK [63:0] output of the PTM requester port. Thus, a single SoC can perform either role, root controller or endpoint.

While FIG. 4 illustrates a single PCIe endpoint, like operations apply to any PCIe endpoint connected to the PCIe root controller. Thus, the vision processing module 204, the LIDAR processing module 214, the radar processing module 208 and the artificial intelligence module 218 are all synchronized with the host/sensor fusion module 216 acting as the PCIe root controller as each of the vision processing module 204, the LIDAR processing module 214, the radar processing module 208 and the artificial intelligence module 218 are configured as shown in FIG. 7 and include the multiplexer 714 and are connected to the host/sensor fusion module 216 with PCIe PTM requester ports.

It is understood that some of the synchronization operations of FIG. 4 are performed by hardware, others are performed by firmware and others by a combination of hardware and firmware. The firmware is stored in the NVM and executed on the appropriate processor.

While the above examples are utilized for vehicle and autonomous operation, it is understood that many other uses are possible, such as industrial control operations, other operations that are improved by tight synchronization of separate ARM-based SoCs and the like.

In the above description, pcie0_txi0_clk is selected to drive the PTMRCLK. However, in other examples, a different clock source within the root controller can be used for PTMRCLK. Such other clock source may become the elected System Time, and the endpoint device may be synchronized in the same manner. Further, while PCIe ports, a PCIe link and PTM synchronization have been described, other types of received time bases, if reproduced in hardware as 64-bit timestamps, can be utilized similar to the PTMCLK. For example, a synchronized, gray-coded counter value can be used to drive the counter interface of the ARM subsystems. A time basis correction factor can be applied to a hardware block similar to NAVCPTS to output a 64-bit timestamp similar to the PTMCLK.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A device comprising:
   a clock selection register;
   a multiplexer that includes:
      a set of data inputs coupled to receive a set of clock signals;
      a control input coupled to the clock selection register; and
      an output;
   a counter that includes:
      an input coupled to the output of the multiplexer; and
      an output configured to provide a timer value;
   a system timer bus coupled to the counter; and
   a processor core that includes an event timer coupled to the system timer bus.

2. The device of claim 1, wherein the set of clock signals includes at least one of: an ethernet phase locked loop (PLL) clock signal or a main PLL clock signal.

3. The device of claim 1 further comprising a pin coupled to a first data input of the set of data inputs of the multiplexer, wherein the set of clock signals includes an external clock signal received via the pin.

4. The device of claim 1, wherein the set of clock signals includes a Peripheral Component Interconnect Express (PCIe) clock signal.

5. The device of claim 1, wherein the timer value is a Gray-coded value.

6. The device of claim 1, wherein the event timer is configured to trigger an event based on the timer value.

7. The device of claim 1, wherein:
   the multiplexer is a first multiplexer;
   the timer value is a first timer value; and
   the device further comprises a second multiplexer that includes:
      a first data input coupled to the output of the counter to receive the first timer value;
      a second data input coupled to receive a second timer value; and
      a data output coupled to the system timer bus.

8. The device of claim 7 further comprising a Peripheral Component Interconnect Express (PCIe) port coupled to the second data input of the second multiplexer and configured to provide the second timer value.

9. The device of claim 1, wherein:
   the processor core is a first processor core;
   the event timer is a first event timer; and
   the device further comprises a second processor core that includes a second event timer coupled to the system timer bus.

10. A method comprising:
    receiving a set of clock signals at a selection circuit;
    selecting, using the selection circuit, a first clock signal from among the set of clock signals;
    generating, using a counter circuit, a timer value based on the first clock signal;
    providing the timer value to an event timer circuit; and
    generating a processor event based on the timer value.

11. The method of claim 10, wherein the set of clock signals includes at least one of: an ethernet phase locked loop (PLL) clock signal or a main PLL clock signal.

12. The method of claim 10, wherein:
    a system on a chip comprises the selection circuit, the counter circuit, and a pin; and
    the set of clock signals includes an external clock signal received via the pin.

13. The method of claim 10, wherein the set of clock signals includes a Peripheral Component Interconnect Express (PCIe) clock signal.

14. The method of claim 10, wherein the timer value is a Gray-coded value.

15. The method of claim 10, wherein:
    the selection circuit is a first selection circuit;
    the timer value is a first timer value; and
    the method further comprises:
       receiving the first timer value and a second timer value at a second selection circuit; and
       providing, using the second selection circuit, a third timer value from among the first timer value and the second timer value.

16. The method of claim 15 further comprising generating the second timer value using a Peripheral Component Interconnect Express (PCIe) port.

\* \* \* \* \*